United States Patent [19]

Wünning

[11] Patent Number: 4,586,894
[45] Date of Patent: May 6, 1986

[54] INDUSTRIAL BURNER FOR GASEOUS OR LIQUID FUELS

[75] Inventor: Joachim Wünning, Leonberg, Fed. Rep. of Germany

[73] Assignee: WS Wärmeprozesstechnik GmbH, Renningen, Fed. Rep. of Germany

[21] Appl. No.: 744,107

[22] Filed: Jun. 12, 1985

[30] Foreign Application Priority Data

Jun. 15, 1984 [DE] Fed. Rep. of Germany ....... 3422229

[51] Int. Cl.⁴ ............................................. F23D 15/00
[52] U.S. Cl. ..................................... 431/158; 431/159; 431/187; 431/215; 431/160; 60/39.31; 60/39.511
[58] Field of Search ............... 431/158, 215, 159, 166, 431/187, 160; 60/39.31, 39.32, 39.511, 753, 266

[56] References Cited

U.S. PATENT DOCUMENTS 3,386,475 6/1968 Horton et al. ...................... 431/158
4,373,903 2/1983 Wunning .......................... 431/160 X

FOREIGN PATENT DOCUMENTS

238865 3/1965 Austria .
2129357 9/1972 Fed. Rep. of Germany .
2243604 5/1973 Fed. Rep. of Germany ...... 431/158

Primary Examiner—Randall L. Green
Attorney, Agent, or Firm—Frishauf, Holtz, Goodman & Woodward

[57] ABSTRACT

A burner for gaseous or liquid fuel for heating furnaces includes a ceramic combustion chamber (20) for incomplete combustion of the fuel with primary air from which hot gases exit at high velocity through a constricted outlet (24). The combustion chamber is surrounded by a chamber (42) for the preheated remainder air necessary to complete combustion. Out of this chamber high velocity jets of air issue through nozzle openings encircling the combustion chamber outlet. Energy is saved and simple construction maintained by providing a tubular heat recuperator (4, 7, 9) rearwardly of the combustion chamber in which a cylindrical wall of temperature resistant steel passes to separate the recuperator into two annular chambers (10,11) and extends forward over a large part of the axial length of the combustion chamber so as to form an outer boundary of the remainder air chamber. The forward extension of the cylindrical wall (9) has an inturned rim constituting the ring-shaped nozzle carrier (33) in which the nozzle openings for the remainder air jets are provided. The combustion chamber is clamped between its spring-loaded fuel pipe (16) and the nozzle carrying rim (33) of the cylindrical wall (9).

22 Claims, 7 Drawing Figures

INDUSTRIAL BURNER FOR GASEOUS OR LIQUID FUELS

This invention concerns a gas or liquid fuel burner for heating furnace chambers of industrial furnaces, the burner having a ceramic combustion chamber supplied with a fuel and a primary air supply for incomplete combustion of the fuel with primary air, and further equipped with a nozzlelike constricted outlet for the gases expelled at high velocity, and also with a chamber for complementary air surrounding the combustion chamber guiding preheated air necessary for the final combustion, out of which air chamber the final combustion air exits at high velocity through nozzle openings forming a ring around the outlet from the combustion chamber.

It is known from German Patent No. 2 129 357 to reduce the content of oxides of nitrogen in the combustion gases by reducing the flame temperature in a burner for gaseous fuel. For this purpose, the burner there disclosed operates with a primary combustion chamber in which the fuel is incompletely burned and a secondary combustion chamber succeeding the primary combustion chamber, in which combustion with the remainder of the theoretically necessary quantity of air is completed. The air supply at this stage is conveniently referred to as remainder air. The primary combustion chamber, designed for combustion of 60% to 90% of the fuel with a quantity of air theoretically necessary for full combustion thereof, is constituted with a nozzlelike constricted outlet from the combustion chamber, which communicates with the furnace chamber and, downstream from the outlet from the combustion chamber and spaced therefrom, an exhaust tube is disposed essentially constituting the secondary combustion chamber which diverges in the direction of flow. The combustion chamber itself can be surrounded by an auxiliary air channel leading the remainder of the theoretically necessary quantity of air for combustion of all the fuel, this channel opening out from the neighborhood of the outlet of the combustion chamber. The relatively cool exhaust gases are sucked and entrained into the exhaust tube by the partly burned gases coming out of the combustion chamber outlet at high velocity. An intermediate cooling of the combustion gases is intended to be produced before their complete combustion, which takes place in the exhaust tube and in the furnace chamber, as well as a strong circulation of the completely burned gases located in the furnace chamber.

Such an exhaust tube disposed at a spacing from the combustion chamber, which is indispensable in the above-described burner for obtaining complete secondary combustion with a corresponding low content of carbon monoxide, is often difficult to produce in the furnace chamber. Apart therefrom, the known burner operates without air preheating, which would not be possible because of the limited ability of the metallic combustion chamber to withstand high temperature. If the air is preheated, the flame temperature is substantially raised and, at the same time, the nitrogen oxide content ($NO_x$) in the exhaust gas also rises. With regard to fuel economy, however, operation of such a high-output low-pollution burner with as great a preheating of air as possible would be desirable.

In another so-called circulation burner, known from Austrian Patent No. 238 865, that also operates with two-stage combustion, a combustion chamber with refractory walls is provided in which the temperature is maintained below the permissible limit for the refractory construction by limitation of air or gas supply. Complete combustion takes place in the burner jet issuing out of the combustion chamber by supply of the remainder air or gas quantity to the burner jet. In practice, this is done by surrounding the combustion chamber by an annular remainder air chamber for guiding the remainder air. That annular chamber has nozzle openings surrounding the outlet of the combustion chamber, which preferably are oriented obliquely to the axis of the outlet opening of the combustion chamber. By this concentric arrangement of the remainder air chamber and the combustion chamber, a preheating of the remainder air quantity is indeed obtained by the heat exchange taking place through the walls of the combustion chamber, but the burner nevertheless operates without preheating of the primary air. Furthermore, in this case, design was not concerned with keeping the pollution content of the exhaust gas as low as possible but, instead, the objective was to maintain the temperature reigning in the combustion chamber itself below the limit of temperature resistance of the refractory walls. The secondary combustion temperature plays no role whatever in this connection.

SUMMARY OF THE INVENTION

It is an object of the present invention to improve burners of the above-described kind in order to provide a burner of low pollution output, particularly a burner with a very small content of carbon monoxide and nitrogen oxides in the exhaust gases, which burner will also be distinguished by a simple construction and a capability of operation even with a high degree of preheating.

Briefly, a cylindrical wall, coaxial with the combustion chamber which it surrounds, is provided over at least a major part of the axial length of the combustion chamber to provide an annular remainder air chamber which it laterally bounds in common with the outer wall of the combustion chamber. The remainder air chamber is closed off at one end by an annular nozzle carrier connected with the cylindrical wall. The combustion chamber is supported at one end by being pressed against the nozzle carrier. Remainder air streams come out of nozzle openings in the nozzle carrier. The combustion chamber is clamped in the axial direction against the nozzle carrier with an elastic force, preferably exerted through its fuel supply pipe.

In this manner, the construction can be made such that the cylindrical wall is part of a tubular heat recuperator which has two coaxial annular chambers through which respectively flow, in counter current, combustion product gases and combustion supporting air, which are separated from each other by the heat exchanging cylindrical wall.

The recuperator makes it possible to obtain a degree of air preheating, and this both for the primary and also the remainder air, which exceeds 50% and also to reduce the $NO_x$ content in the exhaust gas to the region below the range of 200 to 300 parts per million (ppm), even at process temperatures up to 1300° C. such as are found, for example, in the forging of steel, in glass making and in ceramic furnaces. The industrial burner of this invention, accordingly, is distinguished by great operational reliability with simple compact construction.

The nozzle carrier can basically be made as a separate part that is connected to the cylindrical wall of the recuperator. Particularly simple construction relations are provided, however, if the nozzle carrier is formed as a contracted or inturned end portion of the cylindrical wall which is supported endwise against the combustion chamber. The cylindrical wall of the recuperator, consisting of heat resistant steel, has a greater expansion cooefficient than the ceramic material of the combustion chamber. Support, provided with a sealing arrangement if desired, by the interned end portion of the recuperator wall to the combustion chamber, prevents occurrence of excessive stress in the region of the seal or joint thereby extending the service life of the equipment as well as improving the reliability of the burner.

The combustion chamber is clamped with elastic force against the nozzle carrier which grips around it at its rim, the nozzle carrier being, for example, constituted by the contracted or interned end portion of the cylindrical wall of the recuperator. The length differences resulting from the different expansion cooefficients of the nozzle carrier, of the cylindrical wall and the of the combustion chamber are therefore automatically compensated at the place of support without impairment of the sealing effect.

In practice, the above result can be realized when the combustion chamber is pressed against the nozzle carrier by the interposition of a spring-loaded tube bearing against a combustion chamber and which supplies fuel to the combustion chamber while being elastically stressed in the axial direction.

The combustion chamber advantageously has an end wall of substantial surface containing the outlet, connected to a cylindrical lateral wall of the chamber. By observation of the color of incandescence occurring in operation, it is determined that with this construction of the combustion chamber, a flow shadow arises in the interior where the cylindrical sidewall blends into the end wall. In consequence, the temperature loading is lower at this vulnerable location. This effect can also be utilized by having the combustion chamber held and supported against the nozzle carrier in this region of the transistion from the cylindrical sidewall to the end wall.

The combustion chamber itself can advantageously be made as a single part consisting of thin-wall high temperature ceramic, preferably a part that can be replaceably installed in the burner.

Such a combustion chamber can also withstand the extreme temperature loading that occurs with high air preheating and, on account of the above-mentioned construction features, even its sealing against the nozzle ring is trouble-free.

In order to keep down the $NO_x$ content even with the high amounts of air preheating that are used, and also to avoid intolerable carbon monoxide content as the result of incomplete secondary combustion, particularly in the low temperature range, the new burner operates with a high air velocity. This is based on the consideration that both the primary combustion gas jet coming out of the combustion chamber outlet and also the secondary air jets coming out of the nozzle carrier suck cool gas out of the furnace chamber before they unite with each other, in order thereby to reduce the temperature in the remainder or secondary combustion zone. For this purpose, the velocity of the remainder air jets must be so high that these are not immediately deflected by the suction exerted by the main jet towards the latter. The jet axes of the remainder air jets should run either parallel or somewhat inclined towards the main jet when the burner is operated as a normal jet burner.

In order to obtain complete utilization of the combustion chamber pressure required for the primary combustion, a mode of construction can be provided in which the recuperator has an air guide cylinder disposed within the cylindrical wall which terminates at an axial spacing from the rear end of the combustion chamber. Since the air guide cylinder contains no throttling organs, both the combustion chamber and also the remainder air chamber surrounding it receive the impact of the full pressure of the supply primary air. The fuel supply tube can be supported on the bottom (rear) of the combustion chamber opposite the combustion chamber outlet, this chamber bottom having primary air inlet openings distributed uniformly around its longitudinal axis which together provide a total inlet cross sectional area which is substantially greater than the total cross sectional area of the outlet.

The outlet of the combustion chamber can be formed with a number of uniformly distributed outlet openings in order to obtain sucking along of the furnace gases on still shorter paths with intensive mixing-up with the furnace gas. In this connection it has been found that the definite spacing of the remainder air outlet from the main jet, which itself may be subdivided as just mentioned, is of significance. In gas jets issuing out of a nozzle opening, the mass flows are already doubled at a distance of a few nozzle diameters. This means, in the case of the present burner, that the fuel energy in the residual or secondary combustion zone can produce only half the temperature rise when there is such a doubling of the mass flows. With too great a spacing of the remainder air outlets, carbon monoxide is produced by incomplete combustion, especially at low furnace temperatures.

Particularly favorable relations result, as practical experience has shown, if the smallest rim spacing of neighboring outlet openings of the combustion chamber are greater than the aperture width or diameter of these openings. The outlet openings of the combustion chamber and the nozzle openings of the remainder air chamber advantageously lie with their midpoints on concentric circles, with the smallest rim spacing of a nozzle opening to the neighboring outlet opening being greater than three times the clear diameter or width of the nozle opening. The outlet openings and the nozzle openings are in each case arranged symmetrically offset with respect to each other.

The outlet openings can, furthermore, be located in a ceramic plate that is centrally installed in the combustion chamber. In this manner, a particular combustion chamber can be adapted to different applications by simple exchange of the ceramic plates. Plates exposed to heavy temperature loading can be somewhat movable relative to the combustion chamber at their edges so that stresses from locally diferent temperatures may be mitigated or avoided.

For a jet burner, the outlet openings of the combustion chamber and the nozzle openings of the remainder air chamber are disposed in axis-parallellism to each other. The burner of the present invention can also be constituted, however, as a so-called wall jet burner, with the outlet openings then being directed radially oblique outwards, while the nozzle openings are arranged with their axes running perpendicular to the axis of the outlet openings fo the combustion chamber.

In order to reduce the temperature loading in the neighborhood of the thermally highly loaded nozzle openings of the remainder air chamber and the seal location of the remainder air chamber against the combustion chamber, it can be advantageous to provide an individual cooling system in the remainder air chamber near the nozzle carrier, for example in the form of a cool air channel through which cool air passes. For similar reasons, the burner can also have a ceramic radiation shield covering at least the nozzle carrier. This radiation shield is then provided with openings for passage of the remainder air jets and they also have a cylindrical wall portion laterally covering the remainder air chamber partition in a predetermined region.

BRIEF DESCRIPTION OF THE DRAWINGS

The invention is further described by way of illustrative example with reference to the annexed drawings in which.

DESCRIPTION OF THE ILLUSTRATED EMBODIMENTS

The industrial burner illustrated in several embodiments in the figures of the drawings is designed for gaseous or liquid fuels and serves for heating the interior furnace space 1 of an industrial furnace, the wall structure of which is designated 2 and has an opening 3 passing fully throughit and in which the burner is set.

The burner itself has a cylindrical casing tube 4 consisting of steel which is surrounded by a heat insulation layer 5. An air supply tube 6 discharges laterally into the casing tube 4 in the region outside of the furnace chamber wall 2. A coaxial air guide cylinder 7, likewise of steel, is set inside the casing tube 4. The air guide cylinder 7 is sealed at 8 endwise against the casing tube 4 and with the latter bounds a ring space which is divided into two ring chambers 10 and 11 by a cylindrical wall 9 made of highly heat resistance steel.

The cylindrical wall 9 is connected gas-tight with the cylindrical casing 4 and its outer ring chamer 11 is connected with a laterally extending exhaust gas suction pipe 13. In addition, the wall 9 carries heat exchanger ribs 14 projecting into the two ring chambers 10 and 11 which produce, in common with the wall parts lying inbetween, a good heat transfer between media flowing respectively through the two ring chambers 10 and 11.

The cylindrical wall 9, together with the casing tube 4 and the air guide cylinder 7, together form a tube-shaped rib-type recuperator, the space 15 of which, enclosed by the air guide cylinder 7, accepts a coaxial fuel supply pipe 16 which is anchored at one end gas-tight with the casing tube 4 and the cover 160 connected to the air guide cylinder 7. The cover 160 contains a fuel supply elbow line 17 that discharges into the fuel supply pipe 16. An ignition electrode 18 is disposed coaxially within the fuel supply pipe 16.

A substantially pot-shaped ceramic combustion chamber 20 is disposed coaxially to the casing tube 4 and the air guide cylinder 7 at an axial spacing 19 from the partially closed end of the air guide cylinder 7. The ceramic combustion chamber 20 consists a thin-wall highly temperature resistant ceramic vessel, having a wall thickness of, for example, about 6 mm. It has a substantially cylindrical lateral wall portion 21 to which there is joined through a transition region 22 an end wall 23, which in turn has a nozzle-shaped constricted central outlet 24 for the gases coming out of the combustion chamber 20 at high velocity. The air guide cylinder 7 could also be prolonged endwise into a remainder air chamber 42 which is still to be explained.

The combustion chamber 20 is closed off at its end opposite the outlet 24 by a ceramic plate 25 set upon or against it which has primary air inlet openings 26 distributed evenly around the central axis, and is provided in the center with an opening 27 through which projects, into the interior of the chamber, the fuel supply 16 with fuel outlet nozzles indicated at 28.

The fuel supply pipe 16 is supported against the ceramic plate 25 by means of a ring shoulder 29. It contains a spring bellows 30 that operates as an elastic member exerting an elastic axial force on the ceramic plate 25 and the combustion chamber 20.

Figure 6:
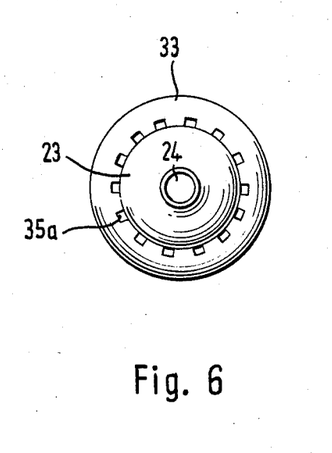
FIG. 6 is a detail end view, partly in section, of a variation of the location of reaminder-air nozzles.

The cylindrical wall 9 of the recuperator projects forward beyond the end wall 31 of the air guiding cylinder 7, actually for the whole axial length of the combustion chamber 20. The forwardly extending part is designated 32. Its extending end is of somewhat reduced diameter along the length of the combustion chamber and it has an inwardly turned rim against which the combustion chamber is pressed and sealed. Nozzle openings 35 are shown in the in-turned rim in FIG. 1 which would alternatively be right against the combustion chamber by the provision of teeth in the rim, which would provide a particular cooling effect for the walls of the combustion chamber (See FIG. 6).

The in-turned end portion 33 of the projecting part 32 forms an annular nozzle carrier, connected with the cylindrical wall 9, here made in one piece with the wall 9. It has nozzle openings 35 which are disposed uniformly distributed around the longitudinal axis of the burner and the nozzle axes are substantially parallel to the burner axis.

As can be seen from the figures, the nozzle carrier provided by the annular part 33 may have a cross-sectional profile more or less semicircular, or may take the shape of a plane annular disc.

Figure 7:
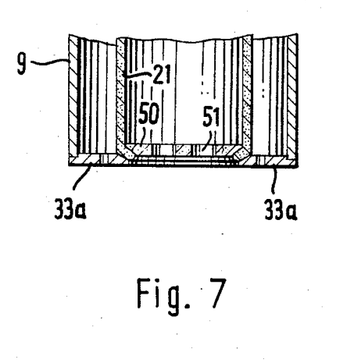
FIG. 7 is a detail cross-section of a variation of the construction of the nozzle carrier.

As shown in FIG. 7, the nozzle carrier may take the shape of a flat annular disc 33a which is connected to the forwardly extending part 32 of th cylindrical wall 9, for example by gas-tight welding. It is basically also possible to constitute this nozzle carrier as a ceramic part, interlocked or otherwise fastened at its rim, to the forwardly extending tube 32 of the cylindrical wall 9.

The combustion chamber 20 is held in place by bearing against the in-turned rim 33 at its extremity 34 under the axial force exerted by the elastic member 30, as already described. From FIGS. 1, 2 and 4, it can be seen that the place of this forward support is approximately in the transition region 22 between the cylindrical wall 21 and the end wall 23 of the combustion chamber which contains the restrictive outlet opening 24. In this "corner region" near the transition region 22 of the combustion chamber wall, there is a so-called flow shadow in the pattern of gas flow resulting in a lower rate of heat transfer and less local temperature loading of the material of the combustion chamber 20. The inturned part 33 providing a rim for the part 32, which like the wall 9 is made of highly heat resistant steel, is accordingly less heavily pressed thermally because its contact with the wall of the combustion chamber is near the region 22 of the latter. Where the nozzle carrying part 33 faces the furnace chamber 1, a somewhat fitting radiation protection shield 36, 37 has its face to the furnace chamber, being situated at a spacing from the parts 33 and 32. It has at 37 a portion that covers the remainder air nozzle openings 35, suitably perforated, and a cylindrical part 38 that provides lateral covering of the forward portion of the extension 32 of the cylindrical wall 9, and thus indirectly covering the transition region 22 of the combustion chamber 20. An annular inlet, in illustrated case formed as a ring of openings, shown as slots separated by partitions that support the fire shield 36, 37, is provided between the fire shield 36, 37 and the heat insulation casing 5 for entry of furnace gases as shown by the arrows 41, leading those gases into the outer annular chamber 11 of the heat recuperator which is connected to the pipe 13.

A ring-shaped remainder air chamber 42 is bounded by the cylindrical extension 32 of the cylindrical wall 9 and the outer surface of the wall of the combustion chamber 20. The air chamber 42 coaxially surrounds the combustion chamber 20, and is supplied at its rearward end with air from the annular chamber 10 of the recuperator which has been preheated by the exiting furnace gases in the annular chamber 11. The air flow from the annular chamber 10 divides as shown by the arrows 43, 44, between the inlet openings 26 at the back of the combustion chamber 20 (primary air) and the remainder air chamber 42 from which the remainder air discharges through the nozzle 35 as remainder air jets designated by the arrows 46.

For operation in a temperature range higher than 1100° C., a supplementary cooling system for the remainder air chamber 42 is provided which is constituted as a cool air ring 47 located in the neighborhood of the transition region 22 of the combustion chamber wall and the nozzle openings 35. The cool air ring 47 is connected with a cool air supply line 48 and a cooling air removal line 49 by intermediate connections not shown in the drawing, in order to simplify the representation. This air cooling system can also be provided with cool air outlet openings for projecting cool air against parts of the burner particularly needing to be cooled.

Figure 1:
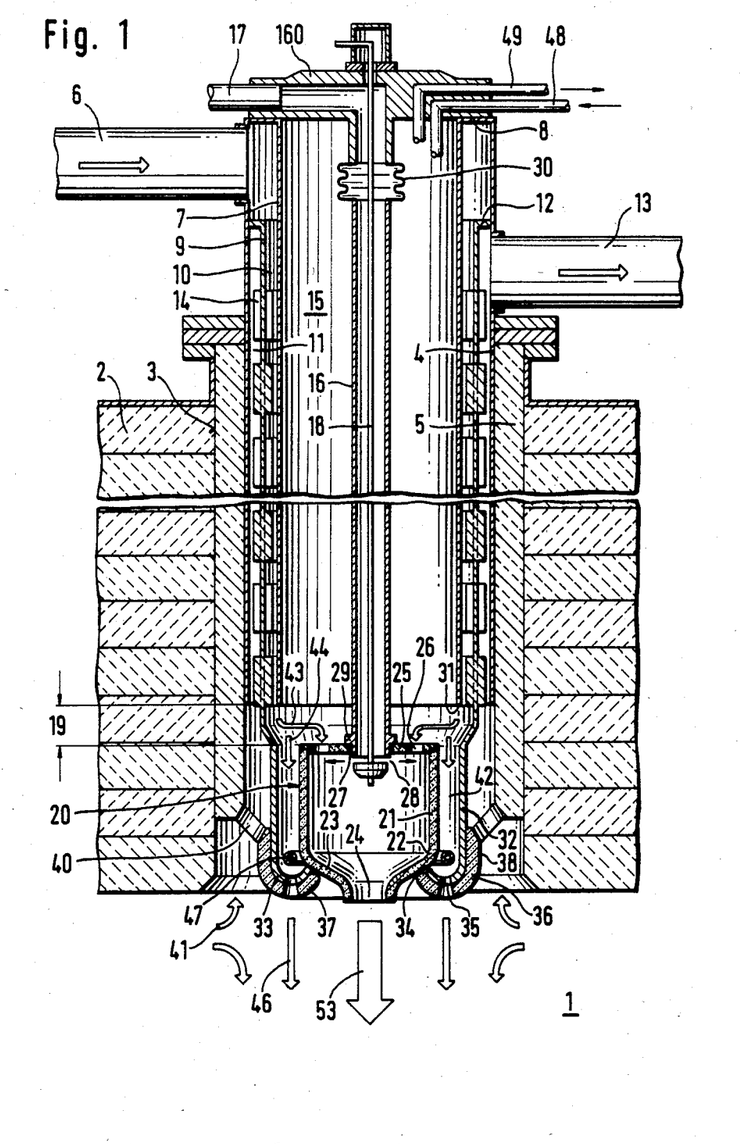
FIG. 1 is an embodiment of an industrial burner according to the invention in the form of a jet burner, shown in axial section providing a schematic side view.
Figure 2:
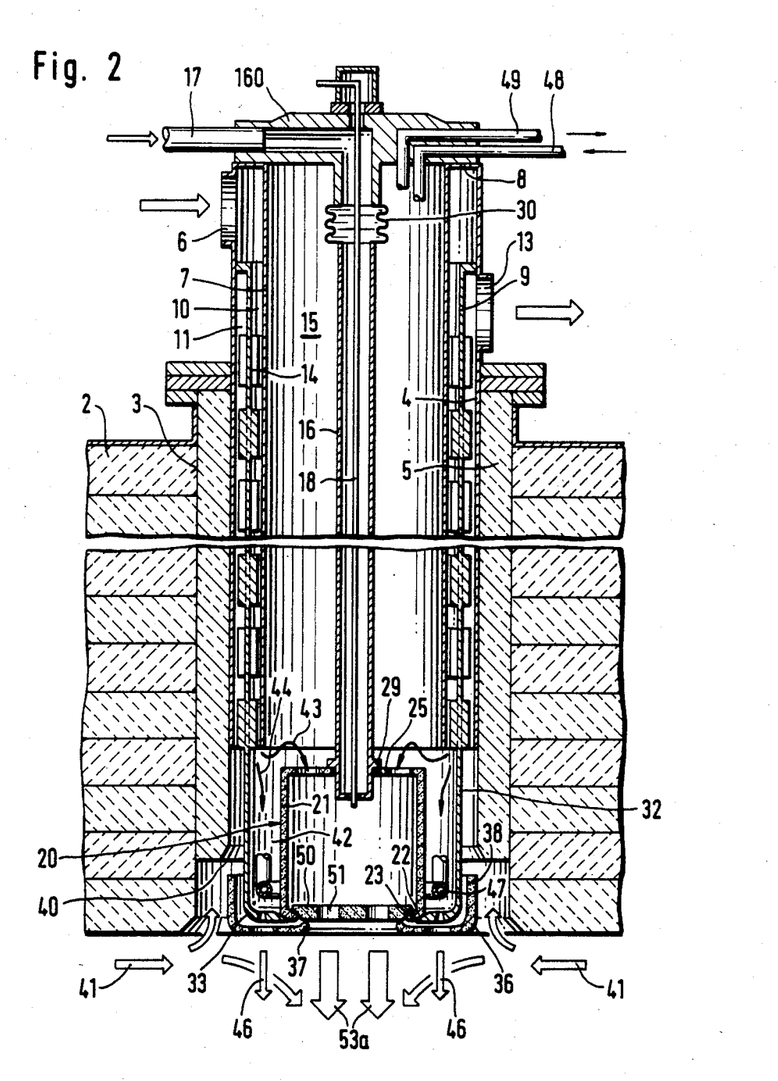
FIG. 2 shows a modified form of the jet burner of FIG. 1 in a corresponding representation.

The embodiment shown in FIG. 2 differs from the embodiment of FIG. 1 merely in that the ceramic combustion chamber 20 has a circular disc 50 with a ring of outlet openings 51, instead of having cylindrical walls brought down to a single opening constriction. The outlet openings 51 are uniformly distributed around the axis of the burner and produce a number of axis-parallel main jets 53a instead of the single main jet 53 issuing out of the outlet 24 in FIG. 1.

Figure 3:
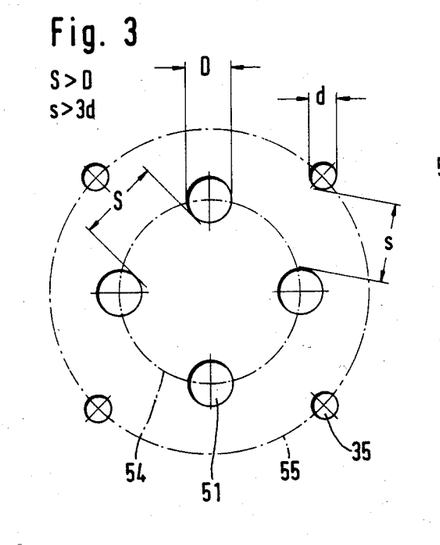
FIG. 3 is a schematic end view of the jet burner of FIG. 2 showing the nozzle arrangement at the discharge end of the burner.

As can be seen in FIG. 3., the embodiment of FIG. 2 has four cylindrical jet opening 51, the mid points of which lie on an imaginary circle 54 concentric with an outer circle 55 on which four remainder air nozzle openings 35 are centered. Both the nozzle openings 35 and the outlet openings 51 are uniformly distributed around the center of the circles and the nozzle openings 35, and the inner and outer set of openings are mutually offset symetrically.

The disposition of these openings, shown in FIG. 3, furthermore, is such that the minimum spacing S between the edges of neighboring outlets 51, is greater than the diameter D of these outlet openings, whereas the minimum spacing s between a nozzle opening 35 and a neighboring outlet opening 51, is more than three times the nozzle opening diameter d.

Figure 4:
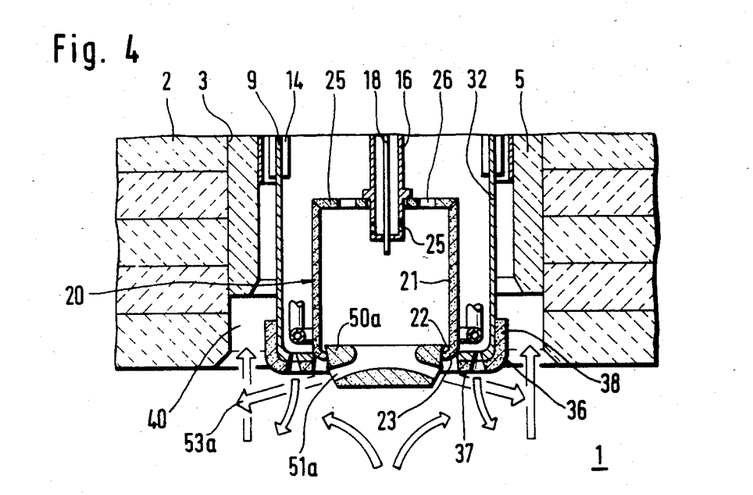
FIG. 4 is a modification of the burner of FIG. 1 constituted as a wall jet burner, being a detailed view in axial section providing a diagramatic side view.

The embodiment illustrated in FIG. 4 is a modification of FIG. 2 in which the nozzle disc 50 is replaced by a nozzle disc 50a of which the nozzle openings 51a are directed in directions lying on the surface of a cone, so that the jets have a small forward component of direction and are radially oblique, in a manner corresponding to the configuration of a so-called wall jet burner.

Figure 5:
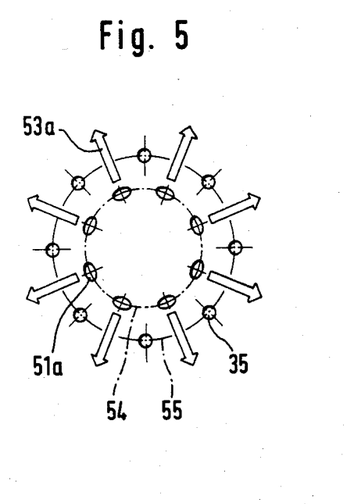
FIG. 5 is a diagram of the nozzle arrangement of the burner of FIG. 4 in a representation corresponding to FIG. 3.

As illustrated in FIG. 5, in this case the nozzle openings 35 guiding the remainder air again lie with their midpoints on the circle 55 and are symetrically offset with reference to the outlet openings 51a, which are likewise uniformly distributed with their midpoints on an inner circle 54. The axes of the remainder air nozzle openings 35 run almost perpendicular to the axes of the gas jets coming out of the outlet openings 51a, as shown in FIG. 4.

The nozzle discs 50 and 50a respectively shown in FIGS. 2 and 4, as can be seen from those figures, are set in the end face of the combustion chamber so that they preserve a certain amount of radial mobility with respect to the combustion chamber 20.

The burner described in the various embodiments of the burner above-described are operated in on-off operation in such a way that gas and air discharge velocity of the order of magnitude of 100 to 150 meters per second takes place at the combustion chamber outlet, i.e., at the single constricted outlet opening 24 of FIG. 1 or at the outlet openings 51 an 51a of FIGS. 2 and 4, as well as at the nozzle openings 35 of all the illustrated embodiemnts, which means that at these openings, a pressure drop of between 1 and 2 kPa and preferably 1.5 kPa, is present. The ratio of the aggregate passage cross-section of the remainder air nozzle opening 35 to the aggregate cross-section of the outlet opening 24, or the outlet openings 51 or 51a, lies between 10% and 50%, preferably at 30%.

In order that the flame may burn in a stable manner, it is desirable for the inner diameter of the combustion chamber 20 and its axial length should both be between twice and four times the diameter of the outlet opening 24 of the embodiment of FIG. 1, preferably three times that diameter.

The following table is an example of a preferred embodiment of an industrial burner according to the invention of the kind illustrated in FIG. 1:

| Burner Data: | | | |
|---|---|---|---|
| Combustion Chamber | 20 | Diameter: | 60 mm |
| | | Length: | 60 mm |
| Main Jet Opening | 24 | Diameter: | 20 mm $A_1 = 3.14$ cm$^2$ 76% |
| Rem Air Nozzles | 35 | Number: | 8  $A_2 = 1.00$ cm$^2$ 24% |
| | | Diameter: | $d = 4$ mm |
| | | Spacing | $s = 25$ mm s/d = 6.25 |
| Feed | | Natural Gas: | 3.5 m$^3$/h |

-continued

Burner Data:

| | | | |
|---|---|---|---|
| | Total Air: | 35 m³/h | |
| Rib-Type Recuperator Heat Exchange No.: | | 0.65 | |
| Measured Values for Operation at Furnace Temperature of 1000° C.: | | | |
| Air Preheat Temperature: | | 750° C. | |
| Exhaust Gas Temperature: | | 420° C. | |
| Pressure Drop at Openings 24 and 35: | | 1.6 kPa | |
| Exhaust Gas Values | Oxygen: | 1.5 vol % | |
| | Nitrogen Oxide: | 190 ppm | |
| | Carbon Monoxide: | <10 ppm | |

Characteristics of Operation (1) The flame burns in a stable manner and with little noise when the combustion chamber has the above-selected dimensions even when the room temperature rises, which is important for on-and-off operation.

(2) The combustion chamber of silicon carbide infiltrated with silicon withstood all the temperature stresses. The conical seal seat at the front end of the combustion chamber is particularly well situated because it takes up the difference in expension between ceramic and metal.

(3) The cooling ring 47 and the insulation for furnace temperatures above 1100° C. reduce the temperature during the off intervals of the burner at the remainder air nozzle opening 35 to the permissible maximum temperature of heat resistant steel (ca. 1100° C.), with the result that only slight losses arise and the furnace atmosphere is not impaired.

(4) With direct heating the combustion gas is sucked away from the directly heated object of each burner in a known way by means of an eductor or directly.

(5) The burner is well suited, in the same form, also for indirect heating in so-called envelope jet heating tubes, where the high flame pulse for the exhaust gas circulation in the jet tube is utilized (flame tube in envelope jet heating tubes separated from burner or P tube, W tube, without flame tube).

Although the invention has been described with reference to particular illustrative examples, it will be recognized that modifications and variations are possible within the inventive concept.

I claim:

1. Industrial burner, for use with gaseous or liquid fuel comprising a ceramic combustion chamber having inlets for primary comprising air and means for supplying to the chamber and igniting a flow of fuel, said chamber also having constricted outlet means for discharge of hot partly burned gas, a remainder-air chamber surrounding said combustion chamber for preheated air necessary to complete the combustion of said fuel and nozzle openings disposed in a ring around said combustion chamber outlet means for discharging air from said remainder-air chamber in high velocity jets, and further comprising:

a cylindrical wall (9) coaxial with and spaced from said combustion chamber, extending over at least part of the length of said chamber to laterally define said remainder-air chamber therewith and extending rearwardly of said combustion chamber;

an annular nozzle carrier (33) connected to said cylindrical wall (9) closing off the forward end of said remainder-air chamber, having nozzle openings therein for forming said high velocity remainder air jets and against which said combustion chamber bears for support, and means (30) for exerting elastic force in an axial direction on said combustion chamber for clamping said combustion chamber against said nozzle carrier (33).

2. Burner according to claim 1, wherein said cylindrical wall is a part of a tubular heat recuperator (4,7, 9) disposed rearwardly of said combustion chamber which separates two coaxial and axially elongated annular chambers (10, 11) through which respectively flow combustion-supporting air and combustion product gases for heat transfer therebetween through said cylindrical wall (9).

3. Burner according to claim 1, in which said means for exerting elastic force on said combustion chamber is constituted by a pipe having a portion providing a surface for transmitting force axially against said combustion chamber and also serving for supplying fuel to said combustion chamber and a resilient axially flexible pipe fitting (30) held under compression and interposed between said fuel supply pipe (16) and a structure including said cylindrical wall (9), for exerting axial force against said combustion chamber.

4. Burner according to claim 2, in which said means for exerting elastic force in an axial direction on said combustion chamber include a fuel supply pipe (16) for said combustion chamber disposed coaxially within said cylindrical wall, having means at its forward end for exerting axial pressure against said combustion chamber and connected to a resilient pipe fitting held in compression between said supply pipe and a stationary fuel supply pipe fixed in a structure to which said cylindrical wall is held in fixed relation.

5. Burner according to claim 1, in which said combustion chamber has a cylindrical lateral wall and a front end wall connected thereto having at least a portion substantially perpendicular to the axis of said cylindrical lateral wall, and containing said combustion chamber outlet means.

6. Burner according to claim 5, in which said combustion chamber bears against said nozzle carrier in the region of a transistion (22) between said cylindrical lateral wall (21) and said end wall (23, 50).

7. Burner according to claim 5, in which said cylindrical lateral wall and said front end wall of said combustion chamber are constituted of one piece of shaped thin-wall, high temperature ceramic.

8. Burner according to claim 7, in which said combustion chamber is demountably held within said cylindrical wall (9) for facilitating replacement thereof by an interchangeable different combustion chamber, and likewise by an identical newer combustion chamber.

9. Burner according to claim 4, in which said combustion chamber is equipped with a removable rear end wall against which said fuel supply pipe transmitting axial force presses, said rear end wall having a configuration for transmitting axial force to said combustion chamber, and also having primary air inlet openings (26) distributed uniformly around the axis of said combustion chamber and having an aggregate cross-sectional passage area which is substantially greater than the aggregate cross-sectional passage area of said combustion chamber outlet means.

10. Burner according to claim 5, in which said combustion chamber outlet means comprises a number of uniformly distributed outlet openings (51, 51a) of such size and distribution that the minimum spacing between edges of neighboring outlet openings is greater than the average diameter of said openings.

11. Burner according to claim 10, in which said outlet openings are disposed with their centers on an inner circle and said nozzle openings (35) of said remainder air chamber (42) provided by said nozzle carrier (33) have their centers located on an outer circle concentric with said inner circle, and wherein the minimum spacing (s) of the edge of a nozzle opening (35) to the neighboring outlet opening (51, 51a) is greater than three times the diameter (d) of said nozzle opening (35).

12. Burner according to claim 10, wherein said front end wall of said combustion chamber containing said outlet openings is constituted as a ceramic plate centrally set in said combustion chamber (20).

13. Burner according to claim 11, wherein said front end wall of said combustion chamber containing said outlet openings is constituted as a ceramic plate centrally set in said combustion chamber.

14. Burner according to claim 9, in which said outlet openings of said combustion chamber and said nozzle openins of said nozzle carrier, in each case provide passages parallel to the axis of said combustion chamber.

15. Burner according to claim 11, in which said outlet openings of said combustion chamber and said nozzle openings of said nozzle carrier in each case provide passages parallel to the axis of said combustion chamber.

16. Burner according to claim 10, in which said outlet openings of said combustion chamber are directed radially outward at a large oblique angle with the axis of said combustion chamber.

17. Burner according to claim 16, in which said nozzle openings of said nozzle carrier provide passages having axes approximately perpendicular to the respective axes of the outlet openings most nearly directed towards them.

18. Burner according to claim 1, in which cooling means are provided within said remaining air chamber (42) in the neighborhood of said nozzle carrier (33) connected with an exernally supplied cooling medium.

19. Burner according to claim 18, in which said cooling means are connected to a supply of cooling air.

20. Burner according to claim 1, in which a ceramic radiation shield (36) is provided for covering the front end, facing into the furnace, of said nozzle carrier and is provided with openings for passage of the remainder air jets issuing from said nozzle openings of said nozzle carrier.

21. Burner according to claim 1, in which a pressure drop of at least 1 kPa is maintained in operation of the burner, both at said combustion chamber outlet means and at said nozzle openings of said nozzle carrier for said remainder air chamber.

22. Burner according to claim 1, in which said nozzle openings of said nozzle carrier are provided at the edges of said nozzle carrier against which said combustion chamber bears.

* * * * *